(12) United States Patent
Varadarajan et al.

(10) Patent No.: US 10,671,843 B2
(45) Date of Patent: Jun. 2, 2020

(54) TECHNOLOGIES FOR DETECTING INTERACTIONS WITH SURFACES FROM A SPHERICAL VIEW OF A ROOM

(71) Applicant: Intel Corporation, Santa Clara, CA (US)

(72) Inventors: Srenivas Varadarajan, Bangalore (IN); Selvakumar Panneer, Portland, OR (US); Omesh Tickoo, Portland, OR (US); Giuseppe Raffa, Portland, OR (US); Carl Marshall, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 194 days.

(21) Appl. No.: 15/883,850

(22) Filed: Jan. 30, 2018

(65) Prior Publication Data
US 2018/0285634 A1   Oct. 4, 2018

(30) Foreign Application Priority Data
Mar. 31, 2017   (IN) ............................ 201741011704

(51) Int. Cl.
| | |
|---|---|
| *G09G 5/00* | (2006.01) |
| *G06K 9/00* | (2006.01) |
| *G06K 9/20* | (2006.01) |
| *G06T 7/73* | (2017.01) |
| *G06K 9/62* | (2006.01) |
| *G06K 9/78* | (2006.01) |

(52) U.S. Cl.
CPC ..... *G06K 9/00355* (2013.01); *G06K 9/00375* (2013.01); *G06K 9/00771* (2013.01); *G06K 9/209* (2013.01); *G06K 9/6256* (2013.01); *G06K 9/6274* (2013.01); *G06K 9/78* (2013.01); *G06T 7/73* (2017.01); *G06T 2207/30196* (2013.01); *G06T 2210/12* (2013.01)

(58) Field of Classification Search
USPC ........ 382/100, 103, 106–107, 154–155, 162, 382/168, 173, 181, 190, 199, 203, 219, 382/224, 232, 254, 274–276, 285–294, 382/305, 321; 345/156, 419, 633
See application file for complete search history.

(56) References Cited

U.S. PATENT DOCUMENTS

| | | | | |
|---|---|---|---|---|
| 6,157,747 | A | * | 12/2000 | Szeliski ................. G06K 9/209 345/419 |
| 2013/0215148 | A1 | * | 8/2013 | Antonyuk ............. G06T 19/006 345/633 |

(Continued)

*Primary Examiner* — Seyed H Azarian
(74) *Attorney, Agent, or Firm* — Barnes & Thornburg LLP

(57) ABSTRACT

Technologies for detecting interactions with surfaces from a spherical view of a room include a compute device. The compute device includes an image capture manager to obtain one or more images that depict a spherical view of a room that includes multiple surfaces. Additionally, the compute device includes a surface interaction detection manager to detect, from the one or more images, a person in the room, generate a bounding box around the person, preprocess the bounding box to represent the person in an upright orientation, determine a pose of the person from the preprocessed bounding box, detect an outstretched hand from the determined pose, and determine, from the detected outstretched hand, a surface of interaction in the room.

24 Claims, 9 Drawing Sheets

(56) References Cited

U.S. PATENT DOCUMENTS

2014/0232631 A1* 8/2014 Fleischmann ........... G06F 3/017
                                                            345/156
2017/0161563 A1* 6/2017 Cetin ..................... H04N 7/183
2018/0174347 A1* 6/2018 Chaney .................. G06T 13/40

* cited by examiner

US 10,671,843 B2

TECHNOLOGIES FOR DETECTING INTERACTIONS WITH SURFACES FROM A SPHERICAL VIEW OF A ROOM

CROSS-REFERENCE TO RELATED APPLICATIONS

This application claims priority to is a continuation of Indian. Patent Application no. 201741011704, entitled "TECHNOLOGIES FOR BRIDGING BETWEEN COARSE-GRAINED AND FINE-GRAINED LOAD BALANCING," which was filed on Mar. 31, 2017.

BACKGROUND

Typical systems for determining the gestures of a person from one or more cameras typically utilize a camera mounted to a finger (e.g., on a ring) of the person or utilize a stereoscopic pair of cameras mounted on a gesture-based human interaction device to track hand motions. Such systems are localized to a single person and, as such, are unable to monitor an entire room in which any of multiple people in the room may be gesturing (e.g., pointing towards a surface). Other typical systems utilize a deformable three dimensional human model and a camera model that is based on carefully measured intrinsic parameters of the camera, to analyze a segmented human silhouette. Such systems are typically unable to compensate for slight environmental differences over time (e.g., lighting changes) or changes in the positioning or intrinsic parameters of the camera. Accordingly, such systems are prone to incorrectly determining the gestures of a person.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
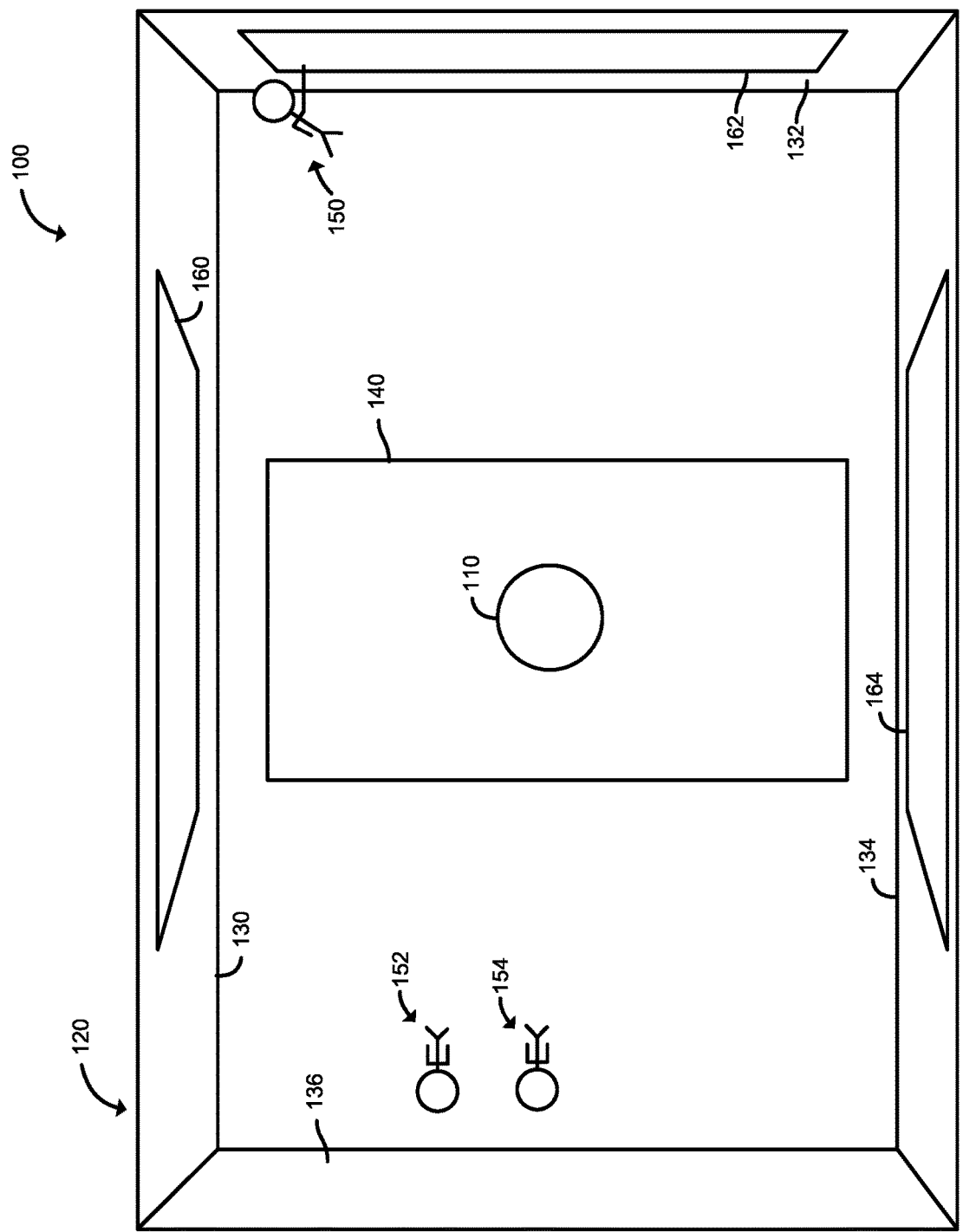
FIG. 1 is a simplified block diagram of at least one embodiment of a system for detecting interactions with surfaces from a spherical view of a room.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

As shown in FIG. 1, an illustrative system 100 for detecting interactions with surfaces from a spherical view of a room includes a compute device 110 mounted in or to a ceiling of a room 120. The illustrative room includes four walls 130, 132, 134, and 136 and a table 140, each of which provides a surface that may be gestured towards by any of several people 150, 152, 154 in the room 120. The walls 130, 132, and 134 each include corresponding display surfaces (e.g., projector screens, marker boards, etc.) 160, 162, and 164 to which information may be provided (e.g., projected, written with a marker, etc.) and/or from which information may be captured (e.g., by a camera). It should be understood that in other embodiments, the room 120 may contain a different number of people and/or surfaces. In operation, the compute device 110 obtains images that depict a warped, spherical view of the room 120, such as from a fish-eye camera mounted in the ceiling. The compute device 110 detects, from the images, people in the room 120, generates bounding boxes around the people and preprocesses the bounding boxes, such as by rotating them to depict the people in an upright orientation (e.g., the person's head is at the top of the coordinate system of the bounding box, and the person's feet are at the bottom), and determines a pose of each detected person by providing the preprocessed bounding boxes to a deep neural network trained to identify portions of the human body (e.g., wrists, shoulders, head, a medial axis extending from the neck to a midpoint between the wrists, etc.). Further, the compute device 110, in operation, detects whether any of the people have an outstretched hand by measuring the perpendicular displacement of each of their wrists from the medial axis and determining whether the perpendicular displacement satisfies a threshold distance. If so, the compute device 110 is configured to determine which surface the person is gesturing (e.g., pointing) towards (referred to herein as the "surface of interaction") by determining a ray along the shoulder and wrist of the outstretched hand and determining which surface the ray intersects. Thereafter, the compute device 110 may perform a further action based on the determined surface of interaction, such as projecting information onto the surface of interaction (e.g., with a projector) or capturing information from the surface (e.g., with a camera). By utilizing a spherical view of the room and providing the preprocessed bounding boxes to a deep neural network for pose determination, the compute device 110 is able to identify gestures and surfaces of interaction across an entire room for any of multiple people, rather than for a single person in a more localized area, and is able to determine the gestures more robustly (e.g., without being affected by slight environmental changes) than in systems that rely on 3D deformable models and precisely measured parameters of a camera.

Figure 2:
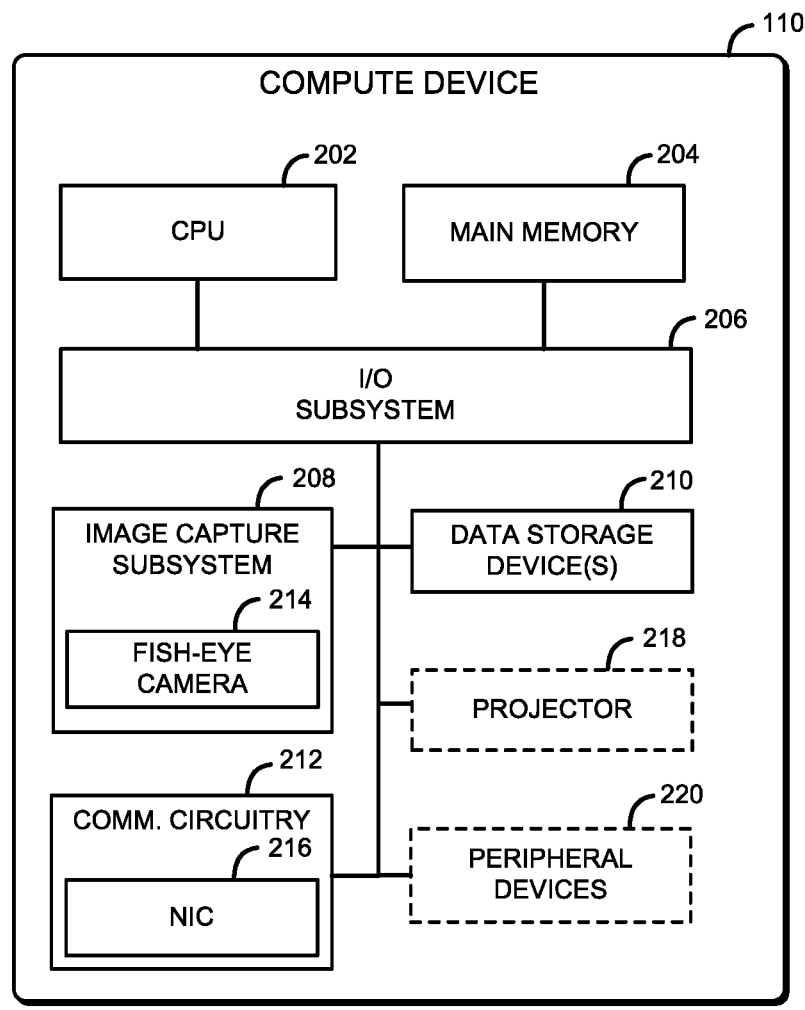
FIG. 2 is a simplified block diagram of at least one embodiment of a compute device of the system of FIG. 1.

Referring now to FIG. 2, the compute device 110 may be embodied as any type of compute device capable of performing the functions described herein, including obtaining images that depict a spherical view of a room, detecting, from the images, one or more people in the room, generating one or more bounding boxes around the one or more people, preprocessing each bounding box to represent each person in an upright orientation, determining a pose of each person from the one or more preprocessed bounding boxes, detecting an outstretched hand from the one or more determined poses, and determining, from the detected outstretched hand, a surface of interaction in the room. As shown in FIG. 2, the illustrative compute device 110 includes a central processing unit (CPU) 202, a main memory 204, an input/output (I/O) subsystem 206, an image capture subsystem 208, one or more data storage devices 210, and communication circuitry 212. Of course, in other embodiments, the compute device 110 may include other or additional components, such as those commonly found in a computer (e.g., display, peripheral devices, etc.). Additionally, in some embodiments, one or more of the illustrative components may be incorporated in, or otherwise form a portion of, another component. For example, in some embodiments, the main memory 204, or portions thereof, may be incorporated in the CPU 202.

The CPU 202 may be embodied as any type of processor capable of performing the functions described herein. The CPU 202 may be embodied as a single or multi-core processor(s), a microcontroller, or other processor or processing/controlling circuit. In some embodiments, the CPU 202 may be embodied as, include, or be coupled to a field programmable gate array (FPGA), an application specific integrated circuit (ASIC), reconfigurable hardware or hardware circuitry, or other specialized hardware to facilitate performance of the functions described herein. Similarly, the main memory 204 may be embodied as any type of volatile (e.g., dynamic random access memory (DRAM), etc.) or non-volatile memory or data storage capable of performing the functions described herein. In some embodiments, all or a portion of the main memory 204 may be integrated into the CPU 202. In operation, the main memory 204 may store various software and data used during operation such as image capture data, pose determination data, surface determination data, operating systems, applications, programs, libraries, and drivers.

The I/O subsystem 206 may be embodied as circuitry and/or components to facilitate input/output operations with the CPU 202, the main memory 204, and other components of the compute device 110. For example, the I/O subsystem 206 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 206 may form a portion of a system-on-a-chip (SoC) and be incorporated, along with one or more of the CPU 202, the main memory 204, and other components of the compute device 110, on a single integrated circuit chip.

The image capture subsystem 208 may be embodied as any circuit, device, or collection thereof, capable of obtaining images that depict a spherical view of a room. In the illustrative embodiment, the image capture subsystem 208 includes a fish-eye camera 214 which may be embodied as any image capture device, such as semiconductor charge-coupled device (CCD) or complementary metal-oxide-semiconductor (CMOS) or N-type metal-oxide-semiconductor (NMOS) image sensor, that includes an ultra-wide angle (e.g., 100 to 180 degree) lens that depicts a distorted, spherical view of an area (e.g., a room) in which the outer edges of the images are curved. In some embodiments, the image capture subsystem 208 is capable of obtaining video images (e.g., a sequence of frames) depicting the room over time. It should be appreciated that, in some embodiments, the image capture subsystem 208 or the fish-eye camera 214 may be mounted to or in the ceiling of the room 120 of FIG. 1, while the remaining components of the compute device 110 are located remotely from the image capture subsystem 208 or fish-eye camera 214.

The one or more illustrative data storage devices 210 may be embodied as any type of devices configured for short-term or long-term storage of data such as, for example, memory devices and circuits, memory cards, hard disk drives, solid-state drives, or other data storage devices. Each data storage device 210 may include a system partition that stores data and firmware code for the data storage device 210. Each data storage device 210 may also include an operating system partition that stores data files and executables for an operating system.

The communication circuitry 212 may be embodied as any communication circuit, device, or collection thereof, capable of enabling communications over a network (not shown) between the compute device 110 and another device (e.g., another compute device). The communication circuitry 212 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 212 includes a network interface controller (NIC) 216. The NIC 216 may be embodied as one or more add-in-boards, daughtercards, network interface cards, controller chips, chipsets, or other devices that may be used by the compute device 110 to connect with another device (another compute device) and transmit or receive data. In some embodiments, NIC 216 may be embodied as part of a system-on-a-chip (SoC) that includes one or more processors, or included on a multichip package that also contains one or more processors. In some embodiments, the NIC 216 may include a local processor (not shown) and/or a local memory (not shown) that are both local to the NIC 216. In such embodiments, the local processor of the NIC 216 may be capable of performing one or more of the functions of the CPU 202 described herein. Additionally or alternatively, in such embodiments, the local memory of the NIC 216 may be integrated into one or more components of the compute device 110 at the board level, socket level, chip level, and/or other levels.

Additionally, the compute device 110 may include a projector 218, which may be embodied as any device capable of projecting an image or sequence of images onto a surface. In the illustrative embodiment, the projector 218 is steerable to enable the projector to direct the projected images towards any surface in the room 120. The compute device 110 may additionally or alternatively include one or more peripheral devices 220. Such peripheral devices 220 may include any type of peripheral device commonly found in a compute device such as a display, speakers, a mouse, a keyboard, and/or other input/output devices, interface devices, and/or other peripheral devices.

Figure 3:
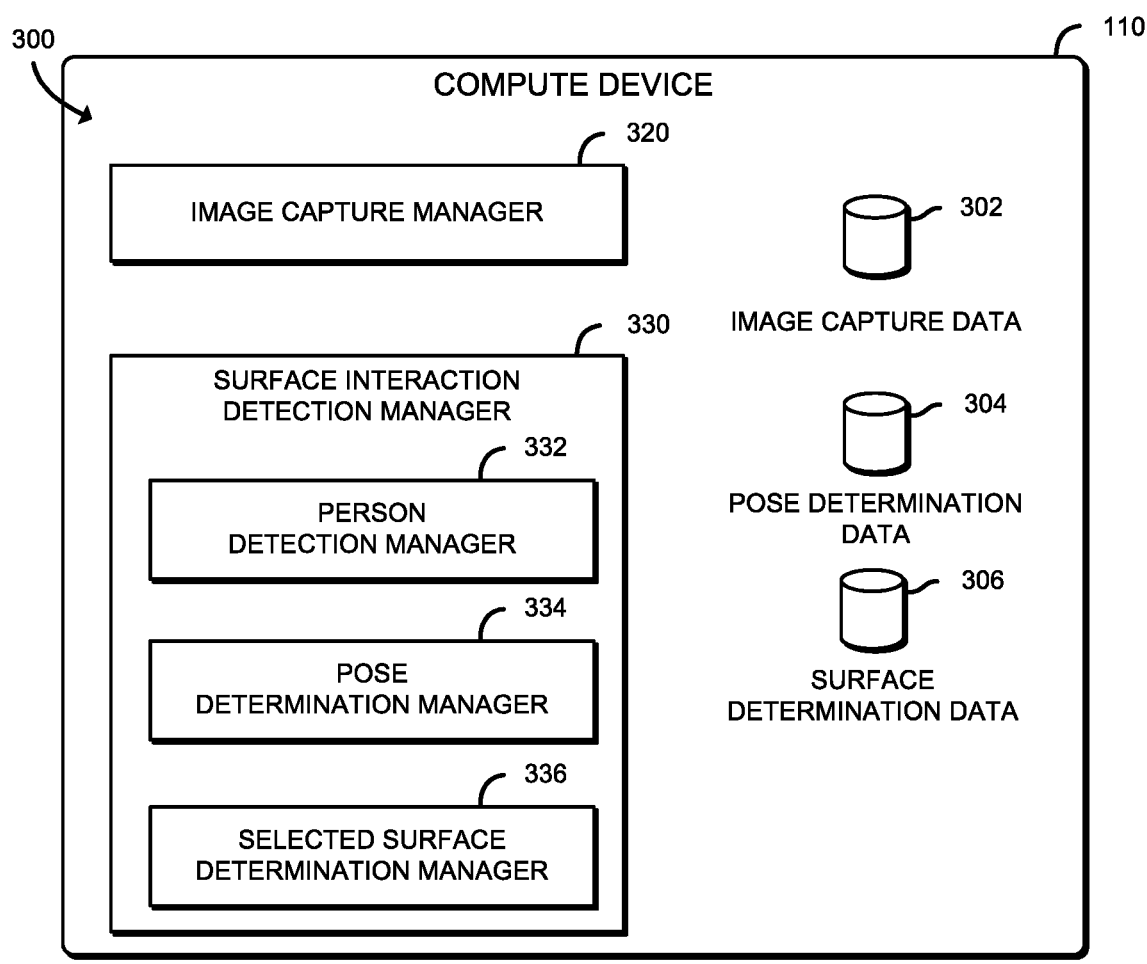
FIG. 3 is a simplified block diagram of an environment that may be established by a compute device of FIGS. 1 and 2.

Referring now to FIG. 3, in the illustrative embodiment, the compute device 110 may establish an environment 300 during operation. The illustrative environment 300 includes an image capture manager 320 and a surface interaction detection manager 330. Each of the components of the environment 300 may be embodied as hardware, firmware, software, or a combination thereof. As such, in some embodiments, one or more of the components of the environment 300 may be embodied as circuitry or a collection of electrical devices (e.g., image capture manager circuitry 320, surface interaction detection manager circuitry 330, etc.). It should be appreciated that, in such embodiments, one or more of the image capture manager circuitry 320 or the surface interaction detection manager circuitry 330 may form a portion of one or more of the CPU 202, the image capture subsystem 208, the main memory 204, the I/O subsystem 206, and/or other components of the compute device 110. In the illustrative embodiment, the environment 300 includes image capture data 302 which may be embodied as any data indicative of one or more images (e.g., key frames of a video, etc.) depicting a spherical view of the room 120 from a fixed position (e.g., from a fixed point in the ceiling).

Additionally, the environment 300 includes pose determination data 304, which may be embodied as any data indicative of bounding boxes around images of people detected in the room, preprocessed versions (e.g., rotated, cropped, scaled, etc.) of the bounding boxes, a deep neural network trained to identify human poses from the images of the people in upright orientations (e.g., head located above the feet), and determined locations of body parts of the people, as determined with the deep neural network. Further, the environment 300 includes surface determination data 306, which may be embodied as any data indicative of dimensions of the room, locations of surfaces in the room, rays extending in the directions of outstretched hands of people, and determinations of where the rays intersect with one or more of the surfaces (e.g., surface(s) of interaction).

In the illustrative environment 300, the image capture manager 320, which may be embodied as hardware, firmware, software, virtualized hardware, emulated architecture, and/or a combination thereof as discussed above, is configured to obtain images (e.g., video frames) depicting a spherical view of the room. In the illustrative embodiment, the image capture manager obtains key frames (e.g., video frames separated by at least a predefined amount of time, such as 0.5 seconds) and that indicate movement of one or more objects (e.g., people) in the room 120.

The surface interaction detection manager 330, which may be embodied as hardware, firmware, software, virtualized hardware, emulated architecture, and/or a combination thereof as discussed above, is configured to detect people in the room, generate bounding boxes around the people, preprocess the bounding boxes to orient images of the people into an upright orientation, apply a deep neural network trained to identify poses of people from images of the people in the upright orientations, and determine whether any of the people are gesturing towards (e.g., pointing towards, writing on, etc.) one or more of the surfaces (e.g., surfaces of interaction). To do so, in the illustrative embodiment, the surface interaction detection manager 330 includes a person detection manager 332, a pose determination manager 334, and a selected surface determination manager 336.

The person detection manager 332, in the illustrative embodiment, is configured to perform a foreground detection algorithm, such as by identifying movement of objects between frames (e.g., by subtracting one frame from another frame) and determining that the moving objects are people. The person detection manager 332, in the illustrative embodiment, is further configured to generate a bounding box (e.g., a rectangle enclosing all of the points of an object) around each object determined to be a person, or around a group of people. The pose determination manager 334, in the illustrative embodiment, is configured to preprocess the bounding boxes, such as to rotate the depictions of the people to be upright, provide the preprocessed bounding boxes to the deep neural network, and determine positions of body parts (e.g., shoulders, wrists, medial axes, etc.) of the people with the deep neural network. A set of locations of body parts of a person is indicative of the pose of the person. The selected surface determination manager 336, in the illustrative embodiment, is configured to determine whether a detected person has an outstretched hand, as a function of the distance of the wrist from the medial axis of the person, draw a ray from the shoulder to the wrist of the outstretched hand, and determine which surface the ray intersects. The selected surface determination manager 336 identifies the intersected surface as the surface of interaction (e.g., the surface pointed towards, drawn on, or otherwise interacted with by the corresponding person).

It should be appreciated that each of the person detection manager 332, the pose determination manager 334, and the selected surface determination manager 336 may be separately embodied as hardware, firmware, software, virtualized hardware, emulated architecture, and/or a combination thereof. For example, the person detection manager 332 may be embodied as a hardware component, while the pose determination manager 334 and the selected surface determination manager 336 are embodied as virtualized hardware components or as some other combination of hardware, firmware, software, virtualized hardware, emulated architecture, and/or a combination thereof.

Figure 4:
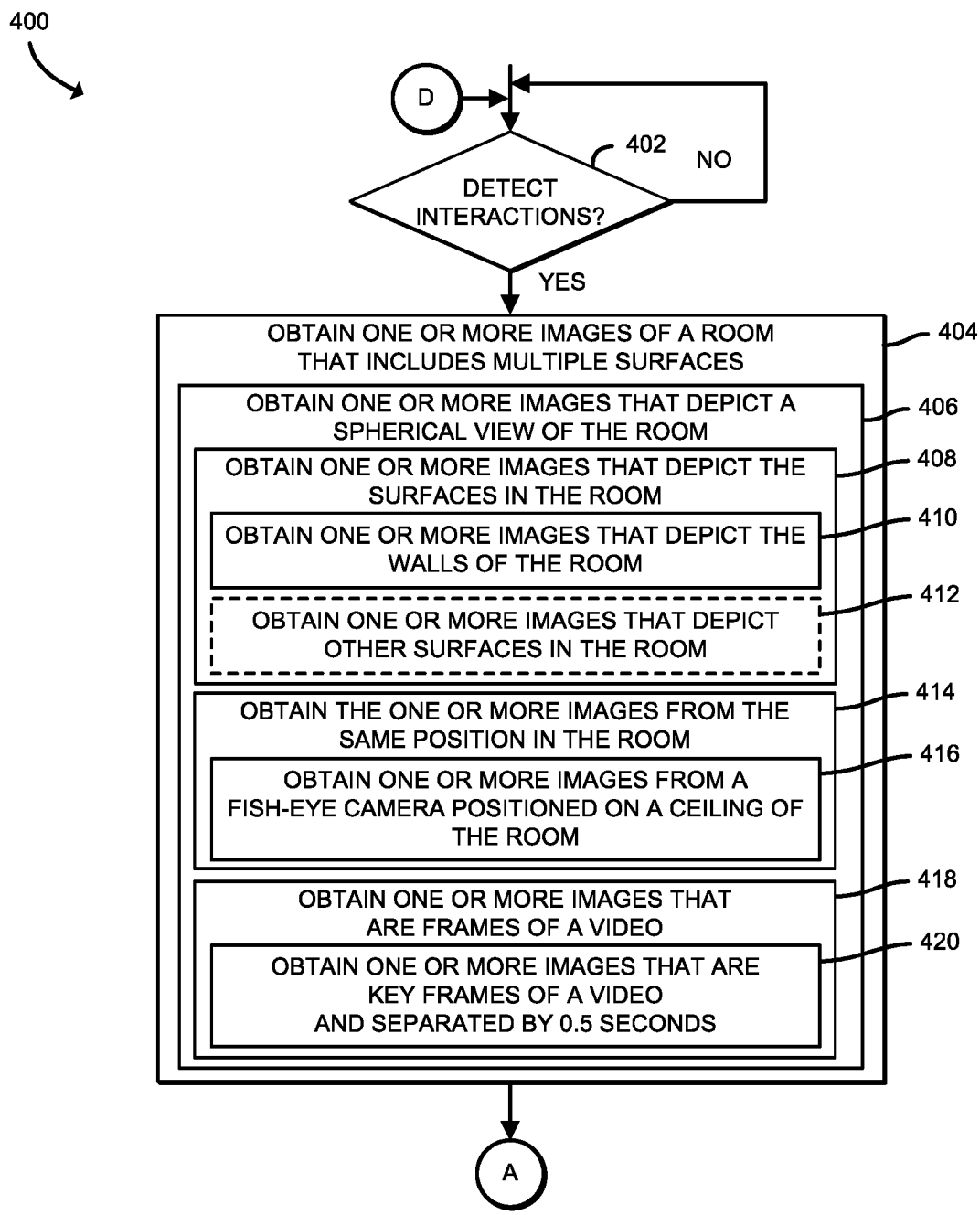
FIGS. 4-7 are a simplified flow diagram of at least one embodiment of a method for detecting interactions with surfaces that may be performed by the compute device of FIGS. 1 and 2.

Referring now to FIG. 4, in use, the compute device 110 may execute a method 400 for detecting, from a spherical view of the room 120, interactions with one or more surfaces of the room 120. The method 400 begins with block 402 in which the compute device 110 determines whether to detect interactions with one or more surfaces of the room 120. In the illustrative embodiment, the compute device 110 determines to detect interactions if the compute device 110 is powered on and has determined that the image capture subsystem 208 is operative. In other embodiments, the compute device 110 determines whether to detect interactions based on other factors. Regardless, in response to a determination to detect interactions, the method 400 advances to block 404 in which the compute device 110 obtains one or more images of a room (e.g., the room 120) that includes multiple surfaces (e.g., the walls 130, 132, 134, 136, including the display surfaces 160, 162, 164 mounted thereon, and the table 140). In doing so, and as indicated in block 406, the compute device 110 obtains one or more images that depict a spherical view of the room 120, such as an ultra-wide angle view in which the outer edges of the images are curved. In the illustrative embodiment, in obtaining the one or more images, the compute device 110 obtains one or more images that depict the surfaces in the room 120, as indicated in block 408. As such, in the illustrative embodiment, the compute device 110 obtains one or more images that depict the walls 130, 132, 134, and 136 of the room, and the display surfaces 160, 162, 164 mounted thereon, as indicated in block 410.

Further, in the illustrative embodiment, one or more images depict other surfaces in the room, such as the table 140, as indicated in block 412. Further, in the illustrative embodiment, the compute device 110 obtains the one or more images from the same position in the room 414. For example, and as indicated in block 416, the compute device 110 may obtain the one or more images from a fish-eye camera (e.g., the fish-eye camera 214) positioned on the ceiling of the room 120 (e.g., looking down on the room 120). As indicated in block 418, in the illustrative embodiment, the compute device 110 obtains the one or more images as frames of a video. Further, and as indicated in block 420, the compute device 110 obtains the images as key frames of the video. The key frames, in the illustrative embodiment, are frames that indicate movement of one or more objects (e.g., people) and are separated in time by at least a threshold amount of time (e.g. 0.5 seconds). By obtaining and analyzing the key frames, rather than every video frame, the compute device 110 may reduce the computational resources that would otherwise be utilized to determine the poses of the people and any surfaces of interaction. Subsequently, the method 400 advances to block 422 of FIG. 5, in which the compute device 110 detects, from the obtained one or more images, at least one person in the room 120.

Figure 5:
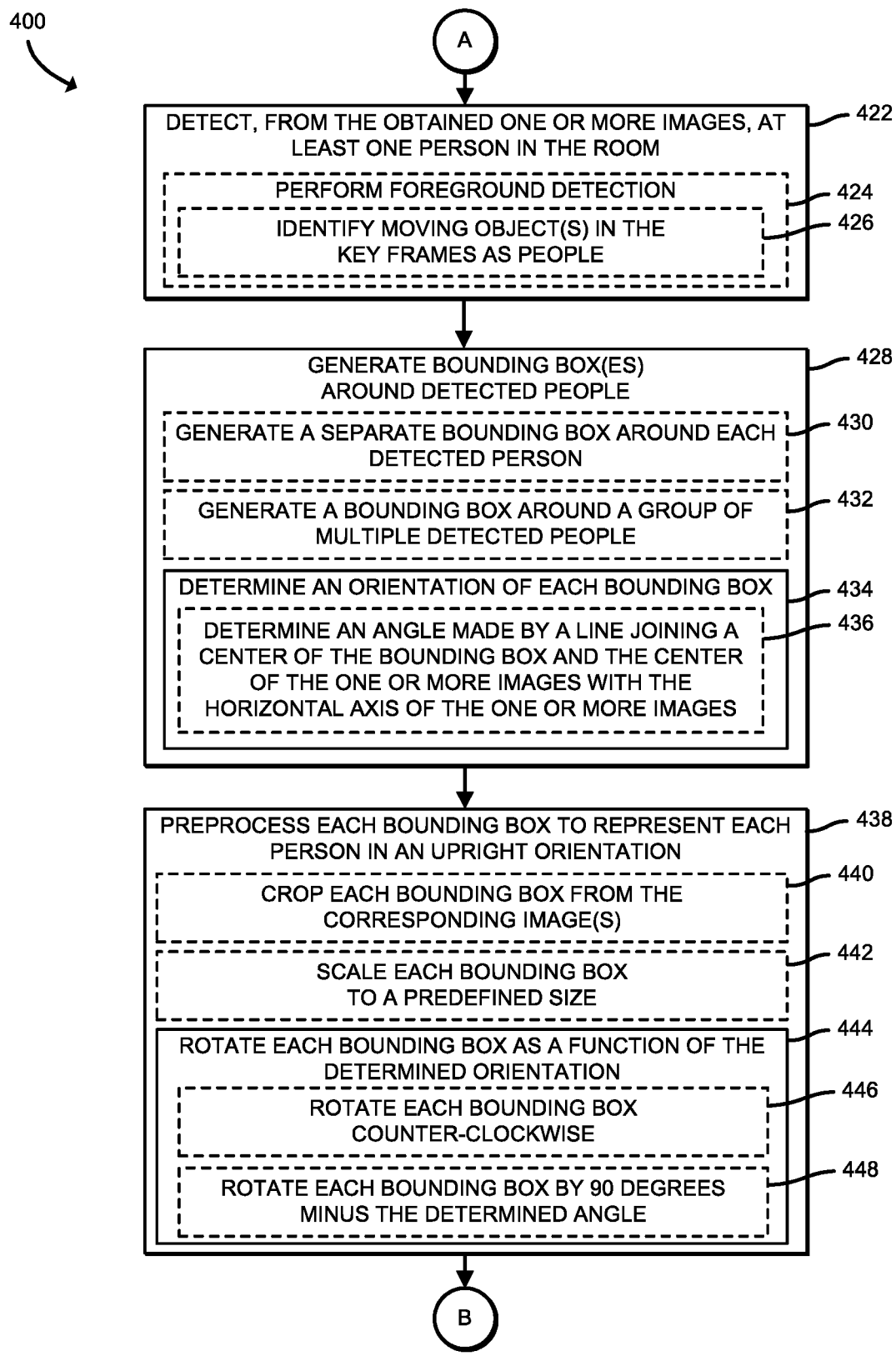

Referring now to FIG. 5, in detecting at least one person in the room 120, the compute device 110 may perform foreground detection, as indicated in block 424. For example, the compute device 110 may subtract one image (e.g., video frame) from a subsequent image (e.g., a subsequent video frame). The result of the subtraction is indicative of moving objects, which constitute the foreground. The compute device 110 may perform the foreground detection on key frames (e.g., the key frames from block 420 of FIG. 4) and identify the moving objects as people, as indicated in block 426. Subsequently, the method 400 advances to block 428 in which the compute device 110 generates one or more bounding boxes around people detected in block 422. In doing so, in the illustrative embodiment, the compute device 110 may generate a separate bounding box around each detected person, as indicated in block 430. Alternatively, the compute device 110 may generate a bounding box around a group of multiple detected people, such as if the people are within a predefined distance of each other, as indicated in block 432.

Figure 8:
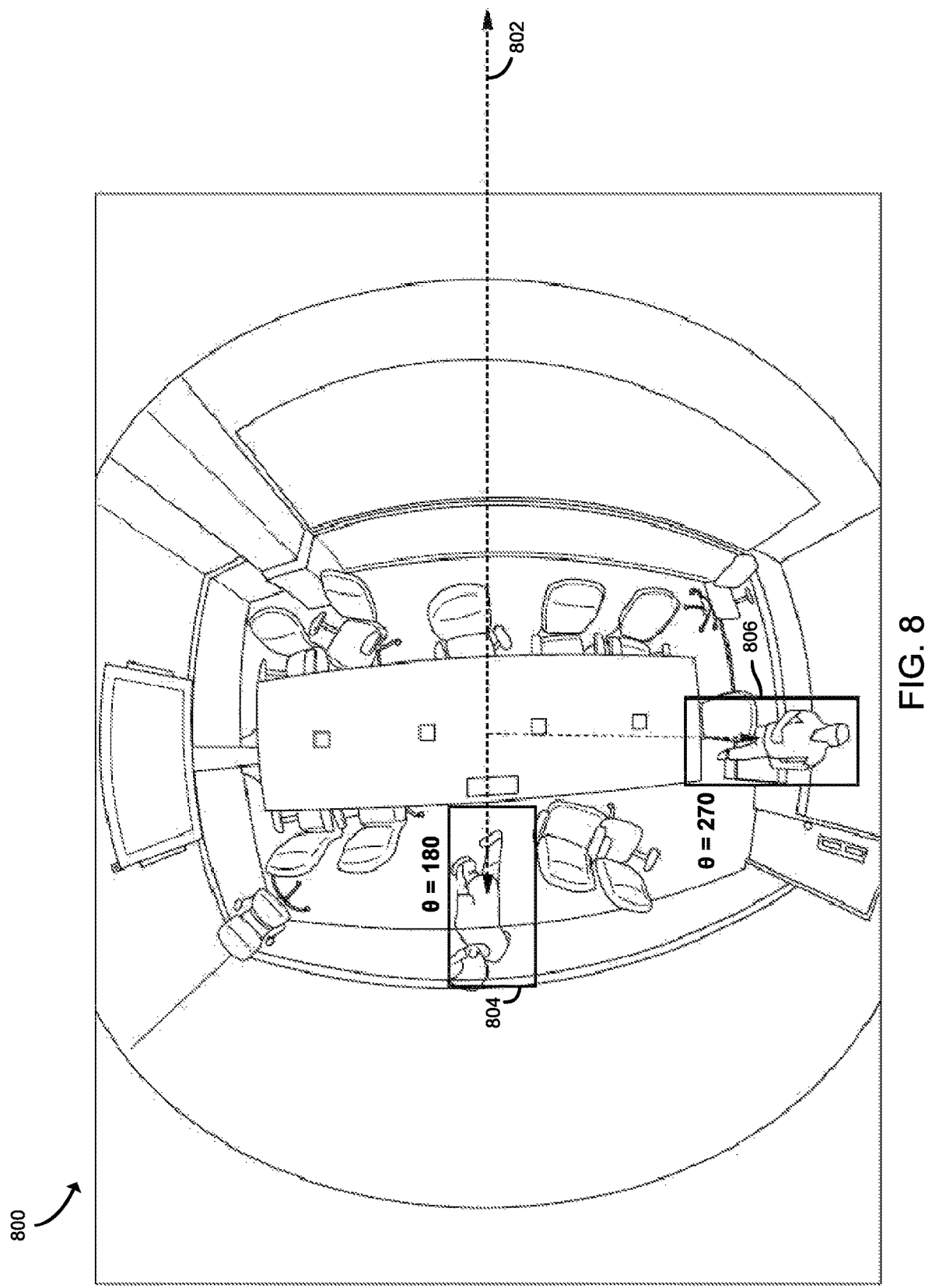
FIG. 8 is a diagram of two bounding boxes in an image that depicts a spherical view of the room of FIG. 1.

Further, the compute device 110, in the illustrative embodiment, determines an orientation of each bounding box, as indicated in block 434. For example, and referring now to FIG. 8, an image 800 may define a coordinate space that includes a horizontal axis 802. In block 436, the compute device 110 may determine the orientation by determining an angle, θ, made by a line joining a center of a bounding box (e.g., each bounding box 804, 806 of FIG. 8) and the center of the image 800 with the horizontal axis 802. Subsequently, in block 438, the compute device 110 preprocesses each bounding box to represent each person in an upright orientation (e.g., head positioned above the feet). In the illustrative embodiment, by preprocessing each bounding box as described herein, the compute device 110 may provide images of the detected people in an orientation (e.g. the upright orientation) usable by the deep neural network to recognize the body parts of the people and their poses. In block 440, the compute device 110, in the illustrative embodiment, crops each bounding box from the corresponding one or more images, to exclude extraneous image data (e.g., image data outside of the bounding box). Further, in the illustrative embodiment, the compute device 110 scales each bounding box to a predefined size (e.g., a height and width measured in pixels), such as a size of images on which the deep neural network was trained, as indicated in block 442. Additionally, and as indicated in block 444, the compute device 110 rotates each bounding box as a function of the determined orientation. As indicated in block 446, the compute device 110, in the illustrative embodiment, rotates each bounding box counter-clockwise. Further, in the illustrative embodiment and as indicated in block 448, in rotating each bounding box, the compute device 110 rotates the bounding box by 90 degrees minus the determined angle, θ (e.g., the angle determined in block 436). As such, it should be understood that in some embodiments, the compute device 110 performs a rotation of 0 degrees (e.g., if the bounding box already represents the person in the upright orientation). Subsequently, the method 400 advances to block 450 of FIG. 6, in which the compute device 110 determines a pose of each detected person from the one or more preprocessed bounding boxes.

Figure 6:
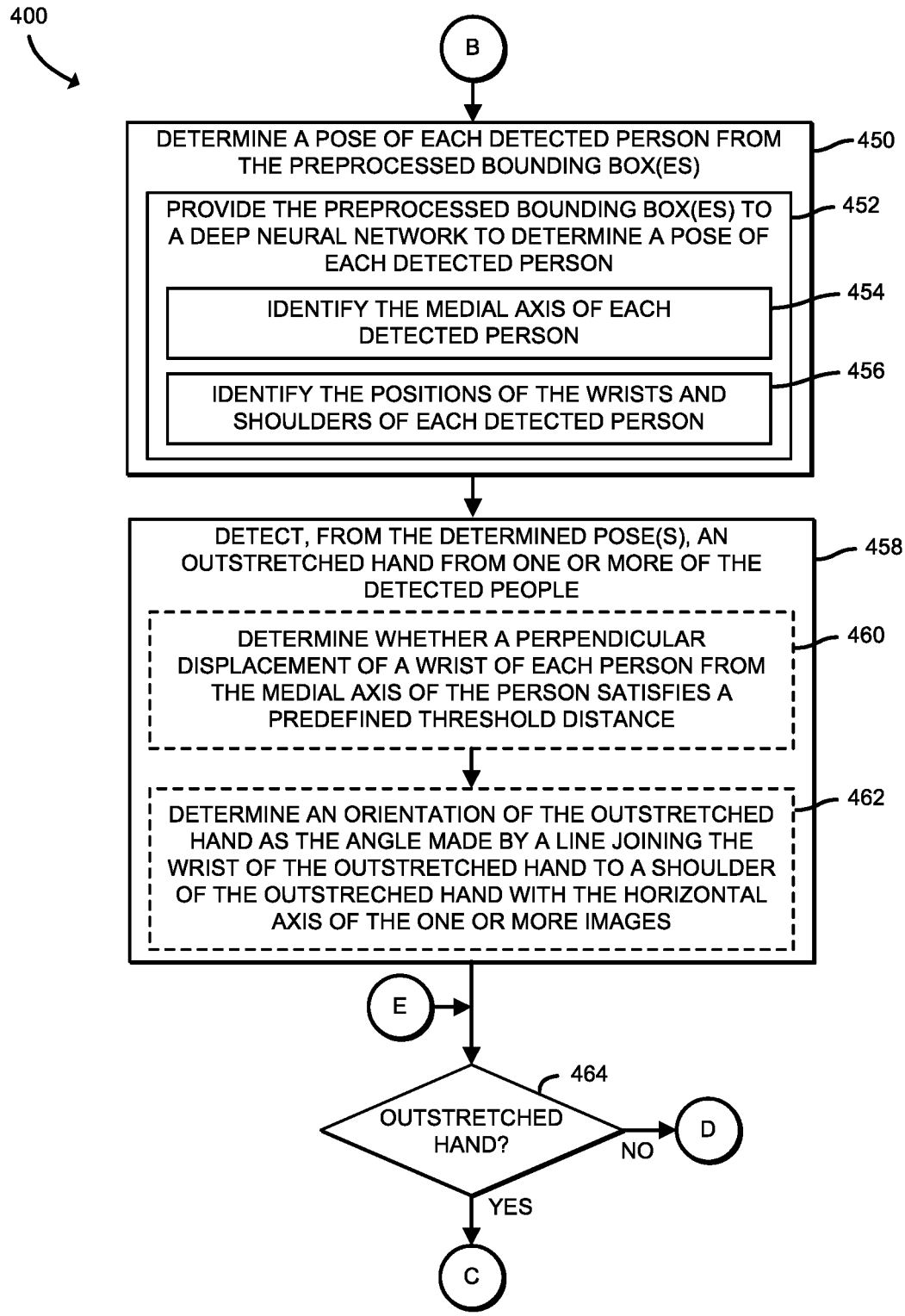
Figure 9:
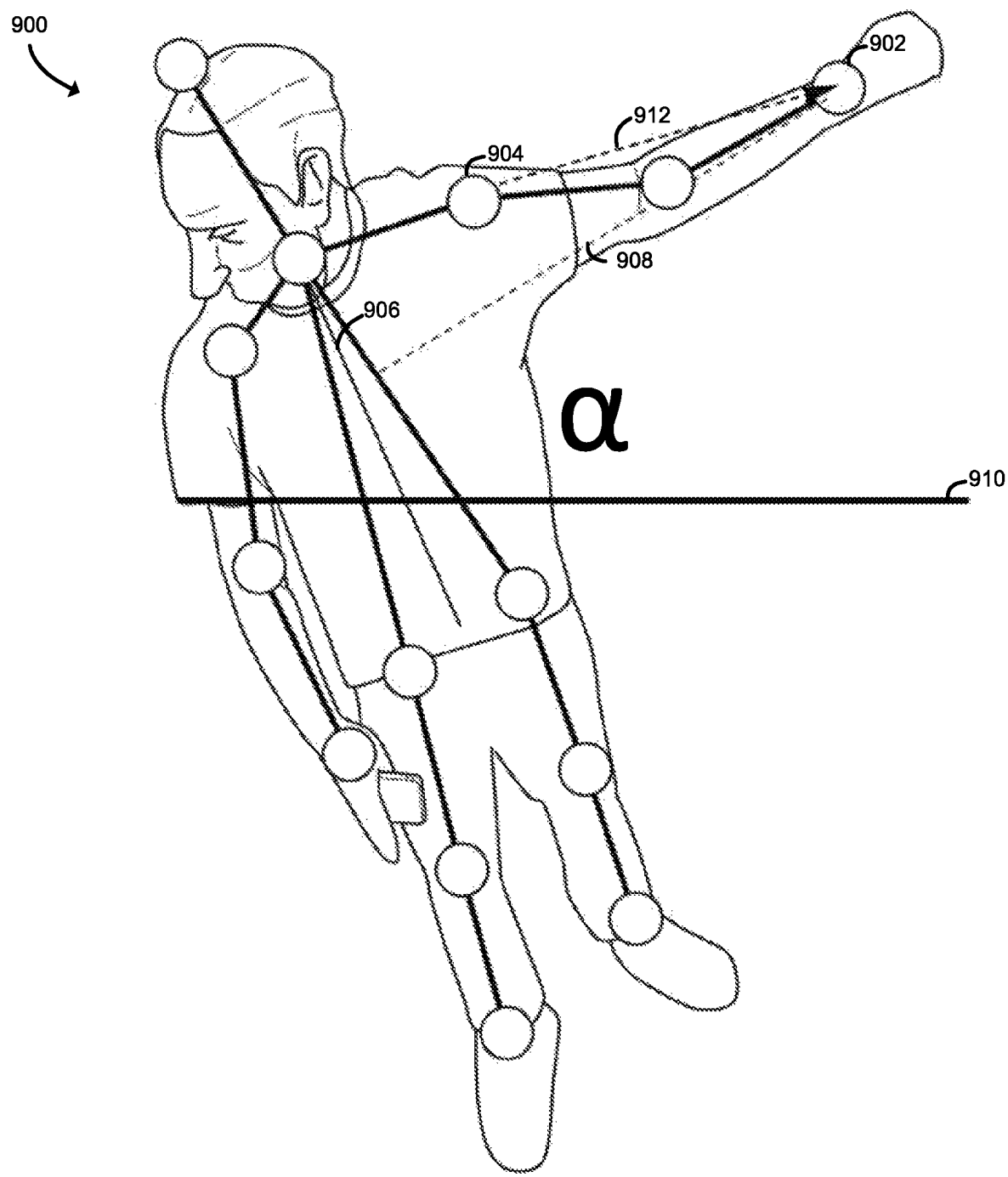
FIG. 9 is a diagram of an image of a person with an outstretched hand that may be detected by the compute device of FIGS. 1 and 2.

Referring now to FIG. 6, in determining the pose of each detected person, the compute device 110 provides the preprocessed bounding boxes to the deep neural network to determine the pose of each detected person, as indicated in block 452. In doing so, the compute device 110, in the illustrative embodiment, identifies the medial axis of each detected person, as indicated in block 454. Additionally, in the illustrative embodiment, the compute device 110 identifies the positions of the wrists and shoulders of each detected person, as indicated in block 456. Referring now to FIG. 9, in an example image 900 of a person in an upright orientation (e.g., after preprocessing of the corresponding bounding box) the compute device 110 has identified the position of a wrist 902 and the position of the corresponding shoulder 904. Additionally, the compute device 110 has identified the medial axis 906, which is a line that joins the neck and the center of the wrists.

Referring back to FIG. 6, the method 400 subsequently advances to block 458, in which the compute device 110 detects, from the determined pose of each detected person, whether any of the detected people have an outstretched hand. In doing so, and as indicated in block 460, the compute device 110 determines whether a perpendicular displacement (e.g., a perpendicular displacement 908 of FIG. 9) of a wrist (e.g., the position of the wrist 902 of FIG. 9) of each person from the medial axis (e.g., the medial axis 906 of FIG. 9) of the person satisfies (e.g., is greater than or equal to) a predefined threshold distance. If the perpendicular displacement satisfies the predefined threshold distance, compute device 110, in the illustrative embodiment, determines an orientation of the outstretched hand as the angle, a, made by a line joining the wrist 902 of the outstretched hand to the shoulder 904 with the horizontal axis (e.g., the horizontal axis 910 of FIG. 9) of the image(s) 900, as indicated in block 462. Subsequently, in block 464, the compute device 110 determines the next course of action based on whether an outstretched hand was detected in block 458. If an outstretched hand was not detected, the method 400 loops back to block 402 of FIG. 4, in which the compute device 110 again determines whether to detect interactions. Otherwise, if an outstretched hand was detected, the method 400 advances to block 466 of FIG. 7, in which the compute device 110 determines the surface of interaction corresponding to the outstretched hand detected in block 458 of FIG. 6.

Figure 7:
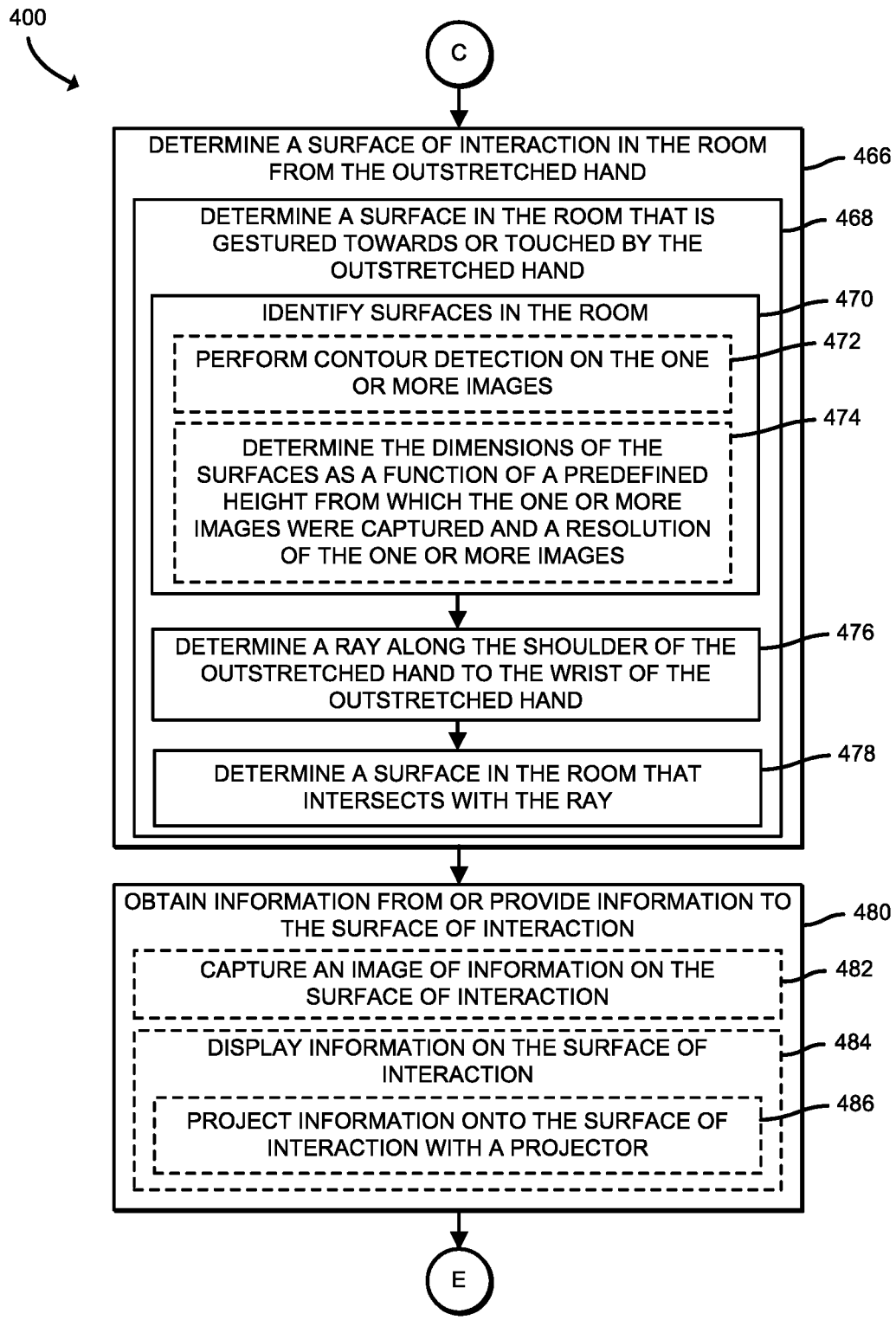

Referring now to FIG. 7, in determining the surface of interaction, the compute device 110, in the illustrative embodiment, determines the surface in the room 120 that is gestured towards or touched by the outstretched hand, as indicated in block 468. In doing so, in the illustrative embodiment, the compute device 110 identifies the surfaces in the room 120, as indicated in block 470. In the illustrative embodiment, in identifying the surfaces, the compute device 110 may perform contour detection (e.g., by detecting discontinuities in brightness) on the one or more images obtained in block 404 of FIG. 4, as indicated in block 472. Additionally or alternatively, the compute device 110 may determine the dimensions of the surfaces as a function of a predefined height from which the one or more images were captured (e.g., the height of the fish-eye camera 214) and the resolution of the one or more images, as indicated in block 474. Subsequently, the compute device 110 determines a ray along the shoulder associated with the outstretched hand to the wrist associated with the outstretched hand, as indicated in block 476. For example, referring briefly to FIG. 9, a ray 912 determined by the compute device 110 extends from the shoulder 904 to the wrist 902 of the outstretched hand. Referring back to FIG. 7, the compute device 110 subsequently determines a surface in the room 120 that intersects with the ray (e.g., the ray 912 of FIG. 9), as indicated in block 478. Accordingly, in the illustrative embodiment, the surface that intersects with the ray 912 is the surface of interaction.

Subsequently, the method 400 advances to block 480 in which the compute device 110, in the illustrative embodiment, obtains information from or provides information to the surface of interaction determined in block 466. In doing so, the compute device 110 may capture an image of information (e.g., handwritten notes, a drawing, etc.) on the surface of interaction, such as with the image capture subsystem 208, as indicated in block 482. Alternatively, the compute device 110 may display information on the surface of interaction, as indicated in block 484. In doing so, the compute device 110 may project information (e.g., images) onto the surface of interaction with a projector, such as the projector 218, as indicated in block 486. Subsequently, the method 400 loops back to block 464 of FIG. 6, to determine whether another outstretched hand was detected.

EXAMPLES

Illustrative examples of the technologies disclosed herein are provided below. An embodiment of the technologies may include any one or more, and any combination of, the examples described below.

Example 1 includes a compute device to detect an interaction with a surface in a room from a spherical view of the room, the compute device comprising an image capture manager to obtain one or more images of a room that includes multiple surfaces, wherein the one or more images depict a spherical view of the room; and a surface interaction detection manager to detect, from the one or more images, a person in the room, generate a bounding box around the person, preprocess the bounding box to represent the person in an upright orientation, determine a pose of the person from the preprocessed bounding box, detect an outstretched hand from the determined pose, and determine, from the detected outstretched hand, a surface of interaction in the room.

Example 2 includes the subject matter of Example 1, and wherein to determine a surface of interaction in the room comprises to identify the surfaces in the room; determine a ray along a shoulder of the outstretched hand to a wrist of the outstretched hand; and determine the surface in the room that intersects with the ray as the surface of interaction.

Example 3 includes the subject matter of any of Examples 1 and 2, and wherein the surface interaction detection manager is further to identify a medial axis of the detected person and identify positions of the wrists and shoulders of the detected person.

Example 4 includes the subject matter of any of Examples 1-3, and wherein to detect an outstretched hand comprises to determine whether a perpendicular displacement of a wrist of the detected person from the medial axis of the detected person satisfies a predefined threshold distance.

Example 5 includes the subject matter of any of Examples 1-4, and wherein the surface interaction detection manager is further to determine, in response to a determination that the perpendicular displacement of the wrist satisfies the predefined threshold, an orientation of the outstretched hand as an angle made by a line that joins the wrist to the shoulder of the outstretched hand with a horizontal axis of the one or more images.

Example 6 includes the subject matter of any of Examples 1-5, and wherein the surface interaction detection manager is further to determine an orientation of the bounding box and wherein to preprocess the bounding box comprises to rotate the bounding box as a function of the determined orientation.

Example 7 includes the subject matter of any of Examples 1-6, and wherein to determine the orientation of the bounding box comprises to determine an angle made by a line between a center of the bounding box and the center of the one or more images with a horizontal axis of the one or more images.

Example 8 includes the subject matter of any of Examples 1-7, and wherein to rotate the bounding box comprises to rotate the bounding box by 90 degrees minus the determined angle.

Example 9 includes the subject matter of any of Examples 1-8, and wherein to determine the pose the person comprises to provide the bounding box to a deep neural network trained to determine poses.

Example 10 includes the subject matter of any of Examples 1-9, and wherein the compute device further comprises a fish-eye camera positioned on a ceiling of the room; and wherein to obtain the one or more images of the room comprises to obtain the one or more images from the fish-eye camera.

Example 11 includes the subject matter of any of Examples 1-10, and wherein the surface interaction detection manager is further to display information on the surface of interaction.

Example 12 includes the subject matter of any of Examples 1-11, and wherein to display information on the surface of interaction comprises to project information onto the surface of interaction with a projector.

Example 13 includes the subject matter of any of Examples 1-12, and wherein the surface interaction detection manager is further to capture an image of information on the surface of interaction.

Example 14 includes the subject matter of any of Examples 1-13, and wherein to obtain the one or more images comprises to obtain one or more images that are frames of a video.

Example 15 includes the subject matter of any of Examples 1-14, and wherein to obtain one or more images that are frames of a video comprises to obtain key frames of a video separated by 0.5 seconds.

Example 16 includes the subject matter of any of Examples 1-15, and wherein to detect the person in the room comprises to perform foreground detection on the one or more images.

Example 17 includes the subject matter of any of Examples 1-16, and wherein the one or more images are key frames of a video and to perform foreground detection comprises to identify an object that moved in the key frames as a person.

Example 18 includes the subject matter of any of Examples 1-17, and wherein to generate the bounding box around the person comprises to generate a separate bounding box around each of multiple people.

Example 19 includes the subject matter of any of Examples 1-18, and wherein to generate bounding box around the person comprises to generate a bounding box around a group of multiple people.

Example 20 includes the subject matter of any of Examples 1-19, and wherein to preprocess the bounding box comprises to crop the bounding box; and scale the bounding box to a predefined size.

Example 21 includes a method for detecting an interaction with a surface in a room from a spherical view of the room, the method comprising obtaining, by a compute device, one or more images of a room that includes multiple surfaces, wherein the one or more images depict a spherical view of the room; detecting, by the compute device and from the one or more images, a person in the room; generating, by the compute device, a bounding box around the person; preprocessing, by the compute device, the bounding box to represent the person in an upright orientation; determining, by the compute device, a pose of the person from the preprocessed bounding box; detecting, by the compute device, an outstretched hand from the determined pose; and determining, by the compute device and from the detected outstretched hand, a surface of interaction in the room.

Example 22 includes the subject matter of Example 21, and wherein determining a surface of interaction in the room comprises identifying, by the compute device, the surfaces in the room; determining, by the compute device, a ray along a shoulder of the outstretched hand to a wrist of the outstretched hand; and determining, by the compute device, the surface in the room that intersects with the ray as the surface of interaction.

Example 23 includes the subject matter of any of Examples 21 and 22, and further including identifying, by the compute device, a medial axis of the detected person; and identifying, by the compute device, positions of the wrists and shoulders of the detected person.

Example 24 includes the subject matter of any of Examples 21-23, and wherein detecting an outstretched hand comprises determining whether a perpendicular displacement of a wrist of the detected person from the medial axis of the detected person satisfies a predefined threshold distance.

Example 25 includes the subject matter of any of Examples 21-24, and further including determining, by the compute device and in response to a determination that the perpendicular displacement of the wrist satisfies the predefined threshold, an orientation of the outstretched hand as an angle made by a line that joins the wrist to the shoulder of the outstretched hand with a horizontal axis of the one or more images.

Example 26 includes the subject matter of any of Examples 21-25, and further including determining, by the compute device, an orientation of the bounding box, and wherein preprocessing the bounding box comprises rotating the bounding box as a function of the determined orientation.

Example 27 includes the subject matter of any of Examples 21-26, and wherein determining the orientation of the bounding box comprises determining an angle made by a line between a center of the bounding box and the center of the one or more images with a horizontal axis of the one or more images.

Example 28 includes the subject matter of any of Examples 21-27, and wherein rotating the bounding box comprises rotating the bounding box by 90 degrees minus the determined angle.

Example 29 includes the subject matter of any of Examples 21-28, and wherein determining a pose of the person comprises providing the bounding box to a deep neural network trained to determine poses.

Example 30 includes the subject matter of any of Examples 21-29, and wherein obtaining the one or more images of the room comprises obtaining the one or more images from a fish-eye camera positioned on a ceiling of the room.

Example 31 includes the subject matter of any of Examples 21-30, and further including displaying, by the compute device, information on the surface of interaction.

Example 32 includes the subject matter of any of Examples 21-31, and wherein displaying information on the surface of interaction comprises projecting information onto the surface of interaction with a projector.

Example 33 includes the subject matter of any of Examples 21-32, and further including capturing, by the compute device, an image of information on the surface of interaction.

Example 34 includes the subject matter of any of Examples 21-33, and wherein obtaining the one or more images comprises obtaining one or more images that are frames of a video.

Example 35 includes the subject matter of any of Examples 21-34, and wherein obtaining one or more images that are frames of a video comprises obtaining key frames of a video separated by 0.5 seconds.

Example 36 includes the subject matter of any of Examples 21-35, and wherein detecting the person in the room comprises performing foreground detection on the one or more images.

Example 37 includes the subject matter of any of Examples 21-36, and wherein the one or more images are key frames of a video and performing foreground detection comprises identifying an object that moved in the key frames as a person.

Example 38 includes the subject matter of any of Examples 21-37, and wherein generating a bounding box comprises generating a separate bounding box around each of multiple people.

Example 39 includes the subject matter of any of Examples 21-38, and wherein generating a bounding box comprises generating a bounding box around a group of multiple people.

Example 40 includes the subject matter of any of Examples 21-39, and wherein preprocessing the bounding box comprises cropping the bounding box; and scaling the bounding box to a predefined size.

Example 41 includes one or more machine-readable storage media comprising a plurality of instructions stored thereon that, in response to being executed, cause a compute device to perform the method of any of Examples 21-40.

Example 42 includes a compute device for detecting an interaction with a surface in a room from a spherical view of the room, the compute device comprising means for obtaining one or more images of a room that includes multiple surfaces, wherein the one or more images depict a spherical view of the room; means for detecting, from the one or more images, a person in the room; means for generating a bounding box around the person; means for preprocessing the bounding box to represent the person in an upright orientation; means for determining a pose of the person from the preprocessed bounding box; means for detecting an outstretched hand from the determined pose; and means for determining, from the detected outstretched hand, a surface of interaction in the room.

Example 43 includes the subject matter of Example 42, and wherein the means for determining a surface of interaction in the room comprises means for identifying the surfaces in the room; means for determining a ray along a shoulder of the outstretched hand to a wrist of the outstretched hand; and means for determining the surface in the room that intersects with the ray as the surface of interaction.

Example 44 includes the subject matter of any of Examples 42 and 43, and further including means for identifying a medial axis of the detected person; and means for identifying positions of the wrists and shoulders of the detected person.

Example 45 includes the subject matter of any of Examples 42-44, and wherein the means for detecting an outstretched hand comprises means for determining whether a perpendicular displacement of a wrist of the detected person from the medial axis of the detected person satisfies a predefined threshold distance.

Example 46 includes the subject matter of any of Examples 42-45, and further including means for determining, in response to a determination that the perpendicular displacement of the wrist satisfies the predefined threshold, an orientation of the outstretched hand as an angle made by a line that joins the wrist to the shoulder of the outstretched hand with a horizontal axis of the one or more images.

Example 47 includes the subject matter of any of Examples 42-46, and further including means for determining an orientation of the bounding box, and wherein the means for preprocessing the bounding box comprises means for rotating the bounding box as a function of the determined orientation.

Example 48 includes the subject matter of any of Examples 42-47, and wherein the means for determining the orientation of the bounding box comprises means for determining an angle made by a line between a center of the bounding box and the center of the one or more images with a horizontal axis of the one or more images.

Example 49 includes the subject matter of any of Examples 42-48, and wherein the means for rotating the bounding box comprises means for rotating the bounding box by 90 degrees minus the determined angle.

Example 50 includes the subject matter of any of Examples 42-49, and wherein the means for determining a pose of the person comprises means for providing the bounding box to a deep neural network trained to determine poses.

Example 51 includes the subject matter of any of Examples 42-50, and wherein the means for obtaining the one or more images of the room comprises means for obtaining the one or more images from a fish-eye camera positioned on a ceiling of the room.

Example 52 includes the subject matter of any of Examples 42-51, and further including means for displaying information on the surface of interaction.

Example 53 includes the subject matter of any of Examples 42-52, and wherein the means for displaying information on the surface of interaction comprises means for projecting information onto the surface of interaction with a projector.

Example 54 includes the subject matter of any of Examples 42-53, and further including means for capturing an image of information on the surface of interaction.

Example 55 includes the subject matter of any of Examples 42-54, and wherein the means for obtaining the one or more images comprises means for obtaining one or more images that are frames of a video.

Example 56 includes the subject matter of any of Examples 42-55, and wherein the means for obtaining one or more images that are frames of a video comprises means for obtaining key frames of a video separated by 0.5 seconds.

Example 57 includes the subject matter of any of Examples 42-56, and wherein the means for detecting the person in the room comprises means for performing foreground detection on the one or more images.

Example 58 includes the subject matter of any of Examples 42-57, and wherein the one or more images are key frames of a video and the means for performing foreground detection comprises means for identifying an object that moved in the key frames as a person.

Example 59 includes the subject matter of any of Examples 42-58, and wherein the means for generating a bounding box comprises means for generating a separate bounding box around each of multiple people.

Example 60 includes the subject matter of any of Examples 42-59, and wherein the means for generating a bounding box comprises means for generating a bounding box around a group of multiple people.

Example 61 includes the subject matter of any of Examples 42-60, and wherein the means for preprocessing the bounding box comprises means for cropping the bounding box; and means for scaling the bounding box to a predefined size.

The invention claimed is:

1. A compute device to detect an interaction with a surface in a room from a spherical view of the room, the compute device comprising:
   an image capture manager to obtain one or more images of a room that includes multiple surfaces, wherein the one or more images depict a spherical view of the room; and a surface interaction detection manager to detect, from the one or more images, a person in the room, generate a bounding box around the person, preprocess the bounding box to represent the person in an upright orientation, determine a pose of the person from the preprocessed bounding box, detect an outstretched hand from the determined pose, and determine, from the detected outstretched hand, a surface of interaction in the room;
wherein to determine the pose of the person comprises to provide the bounding box to a deep neural network trained to determine poses.

2. The compute device of claim 1, wherein to determine a surface of interaction in the room comprises to:
identify the surfaces in the room;
determine a ray along a shoulder of the outstretched hand to a wrist of the outstretched hand; and
determine the surface in the room that intersects with the ray as the surface of interaction.

3. The compute device of claim 1, wherein the surface interaction detection manager is further to identify a medial axis of the detected person and identify positions of the wrists and shoulders of the detected person.

4. The compute device of claim 3, wherein to detect an outstretched hand comprises to determine whether a perpendicular displacement of a wrist of the detected person from the medial axis of the detected person satisfies a predefined threshold distance.

5. The compute device of claim 4, wherein the surface interaction detection manager is further to determine, in response to a determination that the perpendicular displacement of the wrist satisfies the predefined threshold, an orientation of the outstretched hand as an angle made by a line that joins the wrist to the shoulder of the outstretched hand with a horizontal axis of the one or more images.

6. The compute device of claim 1, wherein the surface interaction detection manager is further to determine an orientation of the bounding box and wherein to preprocess the bounding box comprises to rotate the bounding box as a function of the determined orientation.

7. The compute device of claim 6, wherein to determine the orientation of the bounding box comprises to determine an angle made by a line between a center of the bounding box and the center of the one or more images with a horizontal axis of the one or more images.

8. The compute device of claim 7, wherein to rotate the bounding box comprises to rotate the bounding box by 90 degrees minus the determined angle.

9. One or more non-transitory, machine-readable storage media comprising a plurality of instructions stored thereon that, in response to being executed, cause a compute device to:
obtain one or more images of a room that includes multiple surfaces, wherein the one or more images depict a spherical view of the room;
detect, from the one or more images, a person in the room;
generate a bounding box around the person;
preprocess the bounding box to represent the person in an upright orientation;
determine a pose of the person from the preprocessed bounding box, wherein to determine the pose of the person comprises to provide the bounding box to a deep neural network trained to determine poses;
detect an outstretched hand from the determined pose; and
determine, from the detected outstretched hand, a surface of interaction in the room.

10. The one or more machine-readable storage media of claim 9, wherein to determine a surface of interaction in the room comprises to:
identify the surfaces in the room;
determine a ray along a shoulder of the outstretched hand to a wrist of the outstretched hand; and
determine the surface in the room that intersects with the ray as the surface of interaction.

11. The one or more machine-readable storage media of claim 9, wherein, when executed, the plurality of instructions further cause the compute device to:
identify a medial axis of the detected person; and
identify positions of the wrists and shoulders of the detected person.

12. The one or more machine-readable storage media of claim 11, wherein to detect an outstretched hand comprises to determine whether a perpendicular displacement of a wrist of the detected person from the medial axis of the detected person satisfies a predefined threshold distance.

13. The one or more machine-readable storage media of claim 12, wherein, when executed, the plurality of instructions further cause the compute device to determine, in response to a determination that the perpendicular displacement of the wrist satisfies the predefined threshold, an orientation of the outstretched hand as an angle made by a line that joins the wrist to the shoulder of the outstretched hand with a horizontal axis of the one or more images.

14. The one or more machine-readable storage media of claim 9, wherein, when executed, the plurality of instructions further cause the compute device to determine an orientation of the bounding box, and
wherein to preprocess the bounding box comprises to rotate the bounding box as a function of the determined orientation.

15. The one or more machine-readable storage media of claim 14, wherein to determine the orientation of the bounding box comprises to determine an angle made by a line between a center of the bounding box and the center of the one or more images with a horizontal axis of the one or more images.

16. The one or more machine-readable storage media of claim 15, wherein to rotate the bounding box comprises to rotate the bounding box by 90 degrees minus the determined angle.

17. A method for detecting an interaction with a surface in a room from a spherical view of the room, the method comprising:
obtaining, by a compute device, one or more images of a room that includes multiple surfaces, wherein the one or more images depict a spherical view of the room;
detecting, by the compute device and from the one or more images, a person in the room;
generating, by the compute device, a bounding box around the person;
preprocessing, by the compute device, the bounding box to represent the person in an upright orientation;
determining, by the compute device, a pose of the person from the preprocessed bounding box, wherein determining the pose of the person comprises providing the bounding box to a deep neural network trained to determine poses;
detecting, by the compute device, an outstretched hand from the determined pose; and
determining, by the compute device and from the detected outstretched hand, a surface of interaction in the room.

18. The method of claim 17, wherein determining a surface of interaction in the room comprises:

identifying, by the compute device, the surfaces in the room;

determining, by the compute device, a ray along a shoulder of the outstretched hand to a wrist of the outstretched hand; and determining, by the compute device, the surface in the room that intersects with the ray as the surface of interaction.

19. The method of claim 17, further comprising:

identifying, by the compute device, a medial axis of the detected person; and identifying, by the compute device, positions of the wrists and shoulders of the detected person.

20. The method of claim 19, wherein detecting an outstretched hand comprises determining whether a perpendicular displacement of a wrist of the detected person from the medial axis of the detected person satisfies a predefined threshold distance.

21. The method of claim 20, further comprising determining, by the compute device and in response to a determination that the perpendicular displacement of the wrist satisfies the predefined threshold, an orientation of the outstretched hand as an angle made by a line that joins the wrist to the shoulder of the outstretched hand with a horizontal axis of the one or more images.

22. The method of claim 17, further comprising determining, by the compute device, an orientation of the bounding box, and wherein preprocessing the bounding box comprises rotating the bounding box as a function of the determined orientation.

23. The method of claim 22, wherein determining the orientation of the bounding box comprises determining an angle made by a line between a center of the bounding box and the center of the one or more images with a horizontal axis of the one or more images.

24. The method of claim 23, wherein rotating the bounding box comprises rotating the bounding box by 90 degrees minus the determined angle.

* * * * *